United States Patent
Suh

(10) Patent No.: US 7,672,207 B2
(45) Date of Patent: Mar. 2, 2010

(54) RECORDING MEDIUM, METHOD AND APPARATUS FOR RECORDING DATA IN THE RECORDING MEDIUM HAVING A TEST AREA FOR AN OPTIMUM POWER CONTROL

(75) Inventor: Sang Woon Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 1205 days.

(21) Appl. No.: 11/224,241

(22) Filed: Sep. 13, 2005

(65) Prior Publication Data

US 2006/0055990 A1 Mar. 16, 2006

Related U.S. Application Data

(60) Provisional application No. 60/608,897, filed on Sep. 13, 2004.

(30) Foreign Application Priority Data

Jan. 28, 2005 (KR) .................... 10-2005-0008015
Mar. 10, 2005 (KR) .................... 10-2005-0020224

(51) Int. Cl.
*G11B 15/52* (2006.01)

(52) U.S. Cl. ................. 369/47.53; 369/53.27

(58) Field of Classification Search ........... None
See application file for complete search history.

(56) References Cited

U.S. PATENT DOCUMENTS

| 2002/0098806 | A1 | 7/2002 | Park |
| 2002/0150012 | A1 | 10/2002 | Hsiao et al. |
| 2005/0036415 | A1 | 2/2005 | Yoshida et al. |

FOREIGN PATENT DOCUMENTS

| JP | 2001-273637 | 10/2001 |
| JP | 2003-132538 | 5/2003 |

OTHER PUBLICATIONS

International Search Report dated Feb. 7, 2006.
Search Report for corresponding European Application No. 05786909.1 dated Jul. 25, 2008.

*Primary Examiner*—Paul Huber
(74) *Attorney, Agent, or Firm*—Harness, Dickey & Pierce

(57) ABSTRACT

A method and apparatus for recording data in a recording medium are disclosed. The method for recording data in a recording medium including a wobble-shaped test area includes the steps of a) determining a pre-used test area, b) searching for a current OPC start position of the test area by counting the number of wobbles at a wobble-count reference position, c) performing an Optimum Power Control (OPC) process to calculate an optimum write power at the OPC start position, and d) recording data in a data area using the calculated the optimum write power. Therefore, the recording medium can be applied to a method for manufacturing a BD, and a disc test process and data recording/reproducing operations can be effectively performed.

19 Claims, 12 Drawing Sheets

PIC: Permanent Information & Control data
OPC: Optimum Power Control
TDMA: Temporary Disc Management Area
DCZ: Drive Calibration Zone

FIG. 5

| AUN NO. | Correspond ADIP Unit NO. | AUN NO. | Correspond ADIP Unit NO. | AUN NO. | Correspond ADIP Unit NO. | AUN NO. | Correspond ADIP Unit NO. |
|---|---|---|---|---|---|---|---|
| AUN0 | ADIP Word 0' 0 ADIP Unit | AUN4 | ADIP Word 0' 62 ADIP Unit | AUN8 | ADIP Word 1' 41 ADIP Unit | AUN12 | ADIP Word 2' 20 ADIP Unit |
| AUN1 | ADIP Word 0' 15.5 ADIP Unit | AUN5 | ADIP Word 0' 77.5 ADIP Unit | AUN9 | ADIP Word 1' 56.5 ADIP Unit | AUN13 | ADIP Word 2' 35.5 ADIP Unit |
| AUN2 | ADIP Word 0' 31 ADIP Unit | AUN6 | ADIP Word 1' 10 ADIP Unit | AUN10 | ADIP Word 1' 72 ADIP Unit | AUN14 | ADIP Word 2' 51 ADIP Unit |
| AUN3 | ADIP Word 0' 46.5 ADIP Unit | AUN7 | ADIP Word 1' 25.5 ADIP Unit | AUN11 | ADIP Word 2' 4.5 ADIP Unit | AUN15 | ADIP Word 2' 66.5 ADIP Unit |

FIG. 6

| ADIP unit number | ADIP unit type | ADIP nibble bit number | ADIP codeword nibble number |
|---|---|---|---|
| 0 | monotone | --- | --- |
| 1 | sync_0 | --- | |
| 2 | monotone | --- | |
| 3 | sync_1 | --- | |
| 4 | monotone | --- | |
| 5 | sync_2 | --- | |
| 6 | monotone | --- | |
| 7 | sync_3 | --- | |
| 8 | reference | --- | |
| 9 | data_x | $b_3$ | |
| 10 | data_x | $b_2$ | $c_0$ |
| 11 | data_x | $b_1$ | |
| 12 | data_x | $b_0$ | |
| 13 | reference | --- | --- |
| 14 | data_x | $b_3$ | |
| 15 | data_x | $b_2$ | $c_1$ |
| 16 | data_x | $b_1$ | |
| 17 | data_x | $b_0$ | |
| 18 | reference | --- | --- |
| : | : | : | : |
| 8+i*5 | reference | --- | --- |
| 9+i*5 | data_x | $b_3$ | |
| 10+i*5 | data_x | $b_2$ | $c_i$ |
| 11+i*5 | data_x | $b_1$ | |
| 12+i*5 | data_x | $b_0$ | |
| : | : | : | : |
| 78 | reference | --- | --- |
| 79 | data_x | $b_3$ | |
| 80 | data_x | $b_2$ | $c_{14}$ |
| 81 | data_x | $b_1$ | |
| 82 | data_x | $b_0$ | |

RECORDING MEDIUM, METHOD AND APPARATUS FOR RECORDING DATA IN THE RECORDING MEDIUM HAVING A TEST AREA FOR AN OPTIMUM POWER CONTROL

This application claims the benefit of the Korean Patent Application No. 10-2005-0008015, filed on Jan. 28, 2005, and No. 10-2005-0020224, filed on Mar. 10, 2005, which are hereby incorporated by reference as if fully set forth herein.

This application claims the benefit of U.S. Provisional Application No. 60/608,897, filed on Sep. 13, 2004, in the name of inventor Sang Woon SUH, entitled "METHOD OF DETERMINING NEXT OPC START ADDRESS", which is hereby incorporated by reference as if fully set forth herein.

BACKGROUND OF THE INVENTION

1. Field of the Invention

The present invention relates to a method and apparatus for recording data in a recording medium, and more particularly to a method and apparatus for determining a start position of a test area when data is recorded in the recording medium, and recording information of the start position in the recording medium.

2. Discussion of the Related Art

Generally, there has been widely used an optical disc acting as a recording medium capable of recording a large amount of data therein. Particularly, there has recently been developed a high-density optical recording medium capable of recording/ storing high-quality video data and high-quality audio data for a long period of time, for example, a Blu-ray Disc (BD).

The BD based on the next-generation recording medium technique has been considered to be the next-generation optical recording solution capable of storing much more data than a conventional DVD. In recent times, many developers have conducted intensive research into the international standard technical specification associated with the BD along with those of other digital devices.

However, a preferred data record method for use in the BD has not yet been established, such that many limitations and problems occur in developing a BD-based optical recording/ reproducing device.

SUMMARY OF THE INVENTION

Accordingly, the present invention is directed to a method and apparatus for recording data in a recording medium that substantially obviate one or more problems due to limitations and disadvantages of the related art.

An object of the present invention is to provide a method and apparatus for determining a start position of a test area in a recording medium such as a BD, and maximally using a limited record area.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for recording data in a recording medium including a wobble-shaped test area includes the steps of a) determining a pre-used test area, b) searching for a current OPC start position of the test area by counting the number of wobbles at a wobble-count reference position, c) performing an Optimum Power Control (OPC) process to calculate an optimum write power at the OPC start position, and d) recording data in a data area using the calculated the optimum write power.

In another aspect of the present invention, a method for recording data in a recording medium including a wobble-shaped test area includes the steps of a) determining a pre-used test area, b) searching for a current OPC start position of the test area identical with information of a matching table by counting the number of wobbles at a wobble-count reference position, c) performing an Optimum Power Control (OPC) process to calculate an optimum write power at the searched OPC start position, and d) recording data in a data area using the calculated the optimum write power.

In another aspect of the present invention, a method for searching for an Optimum Power Control (OPC) start position of a recording medium including a wobble-shaped test area includes the steps of a) determining a pre-used test area in the test area, b) determining a wobble-count start reference position by checking Address In Pre-groove (ADIP) word start information, and c) searching for an OPC-performing start position of the recording medium by counting the number of wobbles at the wobble-count start reference position.

In another aspect of the present invention, a method for searching for an Optimum Power Control (OPC) start position of a recording medium including a wobble-shaped test area includes the steps of a) determining a pre-used test area in the test area, b) determining a wobble-count start reference position by checking Address In Pre-groove (ADIP) word start information, and c) searching for an OPC-performing start position of the recording medium by counting the number of wobbles corresponding to matching table at the wobble-count start reference position.

In a further aspect of the present invention, an apparatus for recording data in a recording medium includes a memory for storing matching table information, a controller for transmitting a recording command, a recording/reproducing unit for receiving the recording command from the controller, searching for an Optimum Power Control (OPC) start position in a test area of the recording medium, performing an OPC process at the searched OPC start position to calculate an optimum write power, recording information of the calculated optimum write power, and a controller for controlling the recording/reproducing according to a command.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 shows a matching table among the AUN, the ADIP word, and the ADIP unit in accordance with a first preferred embodiment of the present invention;

FIG. 6 shows an example in which a single ADIP word is composed of 83 ADIP units according to the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

A recording medium for use in the present invention is indicative of all recordable mediums, for example, an optical disc, and a magnetic tape, etc., according to various recording schemes. For the convenience of description and better understanding of the present invention, the optical disc, such as a BD, will hereinafter be exemplarily used as the above-mentioned recording medium in the present invention. It should be noted that technical ideas of the present invention can be applied to other recording mediums without departing from the scope and spirit of the invention.

The term "Optimum Power Control (OPC) area" is indicative of a predetermined area assigned to perform an OPC process in the recording medium. The term "Optimum Power control (OPC)" is indicative of a predetermined process capable of calculating an optimum write power when recording data in a recordable optical disc.

In other words, if the optical disc is loaded in a specific optical recording/reproducing device, the optical recording/reproducing device repeatedly performs a predetermined process for recording data in the OPC area of the optical disc, and reproducing the recorded data, such that it calculates an optimum write power applicable to the optical disc. Thereafter, the optical recording/reproducing device uses the calculated optimum write power when recording data in the optical disc. Therefore, the OPC area is required for the recordable optical disc.

The term "Drive Calibration Zone (DCZ) area" is indicative of a specific area used by an optical recording/reproducing device (or a drive) in the recording medium, and can perform not only the OPC process but also a variety of tests required for the optical recording/reproducing device.

In this case, the OPC area and the DCZ area are available for the OPC process. According to the present invention, the OPC area and the DCZ area are generally referred to as test area or test zone. It should be noted that the OPC performing in the OPC area be applicable to even the DCZ area.

Figure 1:
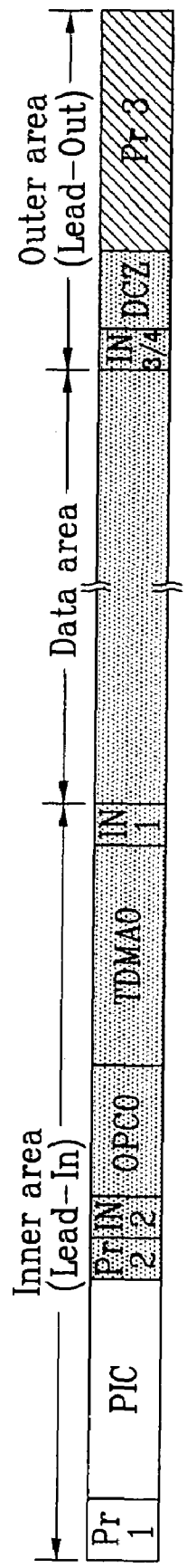
FIG. 1 is a single-layered optical disc structure capable of recording data therein according to the present invention.

FIG. 1 is a single-layered optical disc structure capable of recording data therein. For the convenience of description, a single-layered BD-R capable of recording data therein is shown in FIG. 1.

Referring to FIG. 1, the optical disc sequentially includes an inner area, a data area, and an outer area on the basis of a disc inner circumstance. A specific area contained in each of the inner area and the outer area is used as either a record area for recording disc management information or a test area. The data area records actual user data therein.

A detailed description of the inner area and the outer area will hereinafter be described. The inner area includes a PIC (Permanent Information & Control data) area, an OPC area, and two information areas (i.e., info-areas) IN1 and IN2. The PIC area records disc management information as an embossed HFM (High Frequency Modulated) signal. The OPC area serving as a test area is adapted to perform the OPC process. The info-areas IN1 and IN2 record various disc management information including a Defect Management Area (DMA).

In this case, a write-once BD-R further includes a Temporary Disc Management Area (TDMA) adjacent to the OPC area.

A detailed description of the outer area will hereinafter be described. The outer area includes two other info-areas IN3 and IN4, a DCZ area, and a protection area (Pr3).

The BD-R according to the present invention records data in a groove part in a recording layer composed of a land part and the groove part. The groove part is composed of an HFM-groove and a wobbled groove.

Particularly, the wobbled groove is configured in the form of a wobbled shape using a modulation method associated with a sinusoidal wave in a groove contained in a recording layer. The optical recording/reproducing device can read address information (i.e., ADIP: Address In Pre-groove) of a corresponding groove and general disc information using the above-mentioned wobbled shape.

Figure 2:
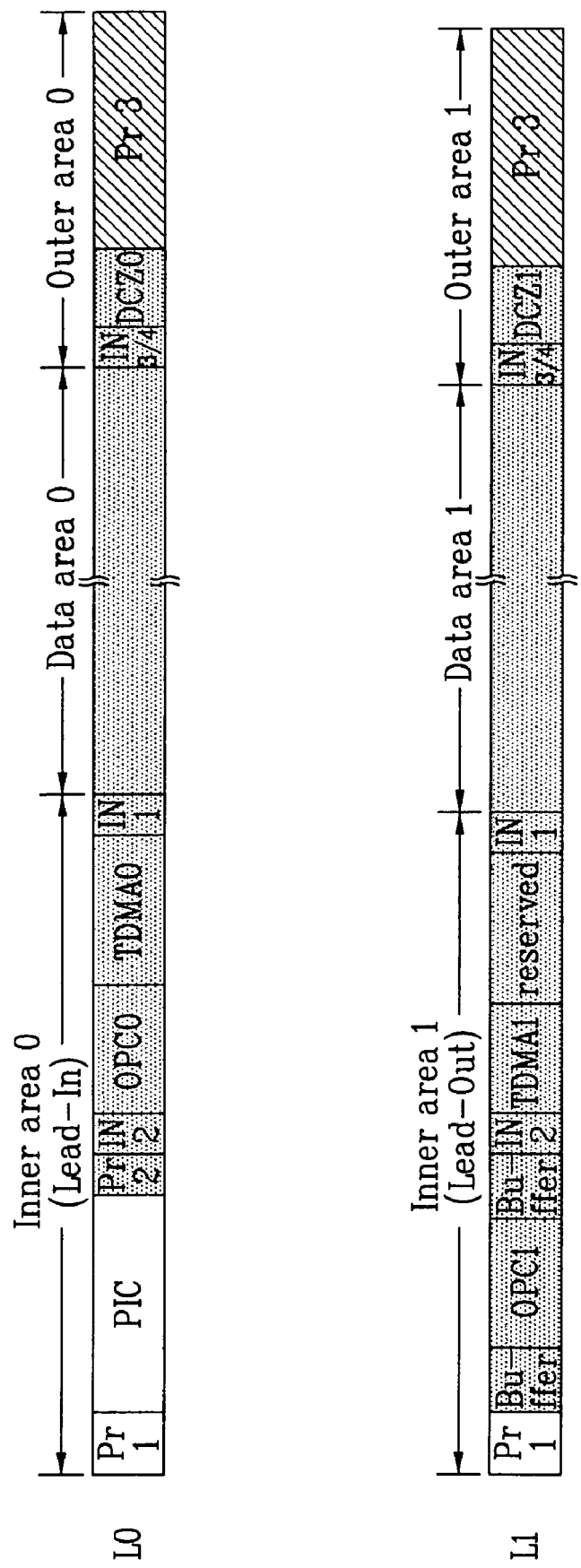
FIG. 2 is a dual-layered optical disc structure capable of recording data therein according to a preferred embodiment of the present invention.

FIG. 2 is a dual-layered optical disc structure capable of recording data therein according to the present invention.

In more detail, a write-once dual-layered BD-R capable of recording data therein is shown in FIG. 2. In this case, one of two recording layers is referred to as a "Layer0 (L0)" and the other one is referred to as a "Layer1 (L1)".

As shown in FIG. 2, individual recording layers have the same structure in the write-once dual-layered BD-R according to the present invention. The inner area of the recording layer L0 includes the OPC area as a test area, and the inner area of the recording layer L1 includes the DCZ area as a test area.

Therefore, if the disc is loaded in the optical recording/reproducing device, the optical recording/reproducing device calculates an optimum write power using the OPC process in the OPC area and/or the DCZ area. In other words, if the disc is loaded in the optical recording/reproducing device, the optical recording/reproducing device performs the recording/reproducing operation as in the single-layered optical disc structure.

An area for storing management information of the test area will hereinafter be described.

Figure 3:
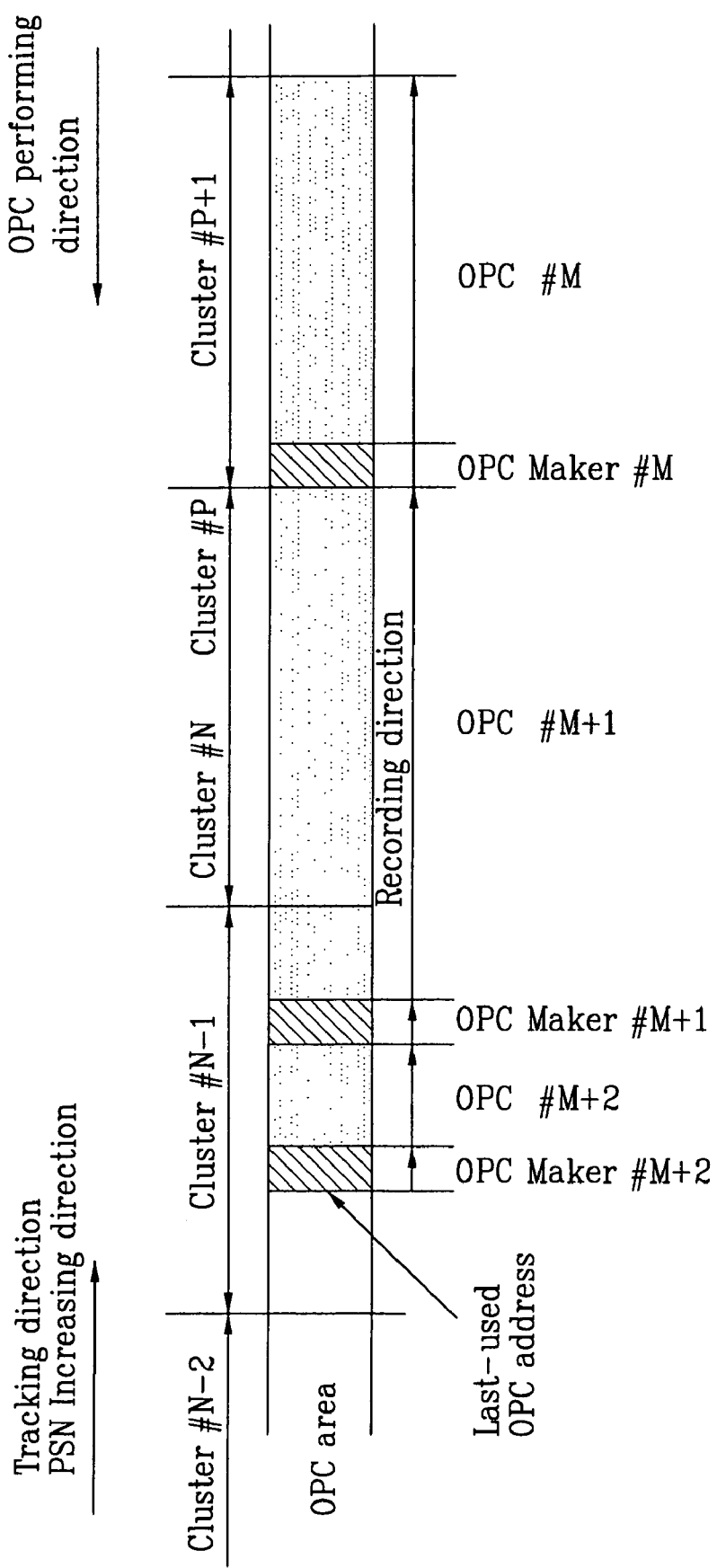
FIG. 3 is a conceptual diagram illustrating a method for performing an Optimum Power Control (OPC) process according to the present invention.

FIG. 3 is a conceptual diagram illustrating a method for performing the OPC process according to the present invention.

A recording-medium tracking direction of the optical recording/reproducing device in the recording medium is determined to be a Physical Sector Number (PSN) increasing direction along which the PSN is increased. The OPC-process performing direction in the recording medium is determined to be a PSN decreasing direction along which the PSN is decreased in the direction from a high PSN to a low PSN.

A recording direction after the OPC process is determined to be a PSN increasing direction from a low PSN to a high PSN in the same manner as in the tracking direction.

In association with the above-mentioned description, a unit for recording data in a data area of the recording medium is a 1-cluster unit, and a unit for recording data by performing the OPC process in the OPC area may act as a 1-cluster unit. However, a data record area acquired by the OPC process may be less than the 1 cluster, and may also be larger than the 1 cluster.

For example, a unit of data recorded to perform the OPC process is equal to an Address Unit Number (AUN). The AUN is indicative of address information used during a data record time. It is obvious to those skilled in the art that an unused OPC area acting as a previous area formed prior to the data recording does not include the above-mentioned AUN information.

In this case, the AUN acts as a unit having a range less than that of the cluster, and a single cluster includes 16 AUNs. In more detail, a single OPC process performing length is selected by the optical recording/reproducing device, and is not limited by the number of physical clusters.

Therefore, as described above, when data acquired by the OPC process is recorded, the data is recorded in AUN units instead of cluster units. In more detail, the BD-R has a limited OPC area and cannot re-use a once-used OPC area, such that there is a need for the BD-R to maximally use the limited OPC area. Therefore, it is very important to determine a start position of a new OPC process in the cluster.

FIG. 3 shows a specific case where three OPC processes are performed. In more detail, FIG. 3 shows a plurality of parts, each of which performs the OPC process, and a plurality of OPC markers for identifying individual parts.

A part for performing a first OPC process is denoted by "Cluster #P+1", and includes a first part denoted by "OPC #M" and a second part denoted by "OPC Marker #M". The "OPC #M" part records data therein, and the "OPC Marker #M" part identifies the "OPC #M" part.

A part for performing a second OPC process includes "Cluster #P", "Cluster #N", and some parts of "Cluster #N−1". A part denoted by "OPC #M+1" records data therein, and the "OPC Marker #M+1" identifies the "OPC #M+1" part.

A part for performing a third OPC process is composed of some parts of the "Cluster #N−1" part. In more detail, the part for performing the third OPC process includes "OPC #M+2" and "OPC Marker #M+2". The "OPC #M+2" part records data therein, and the "OPC Marker #M+2" part identifies the "OPC #M+2" part. In this case, "Cluster #N−2" and some parts of the "Cluster #N−1" part positioned prior to the "OPC Marker #M+2" part serve as unused cluster areas.

In association with the above-mentioned description, the distance between two successive OPC markers from among OPC markers capable of identifying data record areas associated with the OPC process is equal to or less than a predetermined distance corresponding to 16 clusters. For example, in order to satisfy the above-mentioned requirements in the OPC process requiring at least 16 clusters, the OPC marker must be inserted into the OPC process. In this case, the above-mentioned OPC marker must have a predetermined length corresponding to at least 868 NWLs (Nominal Wobble Lengths).

The "OPC #M" part shown in FIG. 3 occupies a single cluster (i.e., 1 cluster) in the OPC area. The "OPC #M+1" part occupies a predetermined area larger than the 1 cluster in the OPC area. The "OPC #M+2" part occupies a predetermined area less than the 1 cluster in the OPC area. It can be understood that the OPC process is performed in unit smaller than cluster unit, for example, AUN unit.

Therefore, the "OPC #M+2" part recorded by the last OPC process occupies a predetermined area less than the 1 cluster in the OPC area, and the part "A" indicative of some parts of the cluster #N−1" part remains unused.

Figure 4:
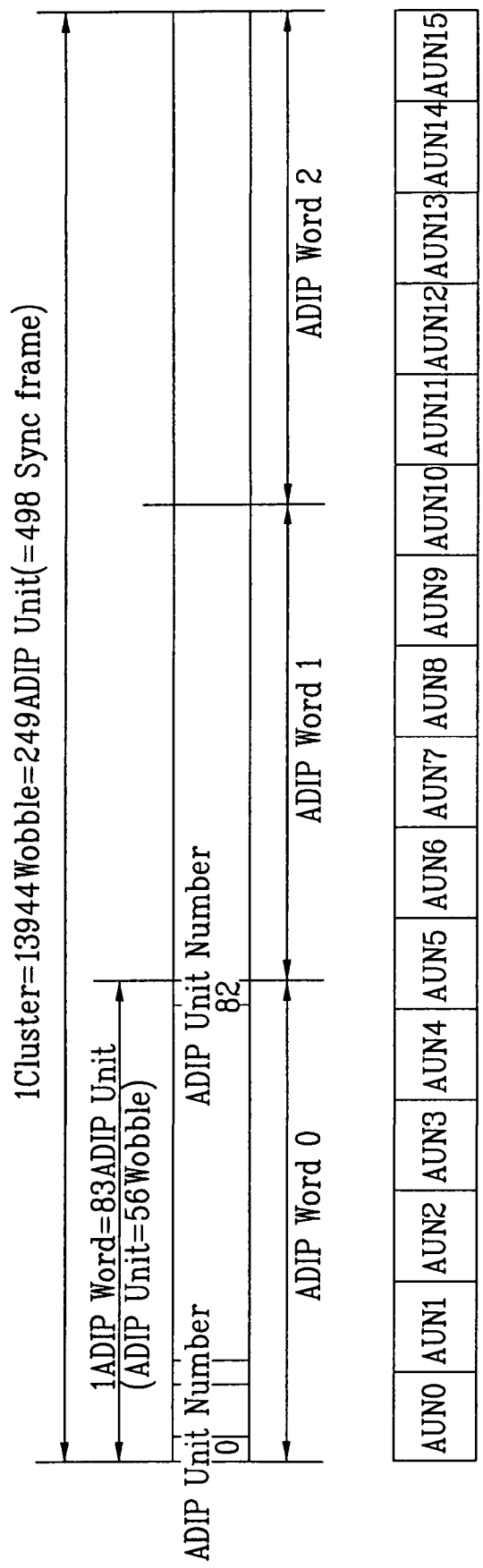
FIG. 4 is a conceptual diagram illustrating a relationship among a cluster, an ADIP (Address In Pre-groove) word, an AUN (Address Unit Number), an ADIP unit, and a wobble according to the present invention.

FIG. 4 is a conceptual diagram illustrating a relationship among a cluster, an ADIP word, an AUN, an ADIP unit, and a wobble according to the present invention.

Referring to FIG. 4, the 1 cluster from among the OPC area is shown in FIG. 4. The 1 cluster includes 13944 wobbles, and includes 249 ADIP units. The 1 cluster corresponds to 498 sync frames, and also corresponds to 3 ADIP words. In this case, three ADIP words are the ADIP word 0, the ADIP word 1, and the ADIP word 2 as shown in FIG. 4.

In association with the above-mentioned description, the 1 ADIP word includes 83 ADIP units, and the ADIP unit includes 56 wobbles. The 1 cluster includes 16 AUNs. In this case, a single AUN corresponds to the length of 868 wobbles, and also corresponds to 15.5 ADIP units. In this case, the wobble is indicative of an NWL (Nominal Wobble Length).

FIG. 5 shows a matching table among the AUN, the ADIP word, and the ADIP unit in accordance with a first preferred embodiment of the present invention.

Referring to FIG. 5, the length of the 1 AUN is equal to the length of 15.5 ADIP unit, such that individual ADIP words at start positions of individual AUNs are matched to ADIP units contained in individual ADIP words, resulting in the creation of a table.

The AUN0 shown in FIG. 5 corresponds to the "0 ADIP unit" of the "ADIP word 0". The AUN1 corresponds to the "15.5 ADIP unit" of the "ADIP word 0". The AUN2 corresponds to the "3 ADIP unit" of the "ADIP word 0". The AUN3 corresponds to the "46.5 ADIP unit" of the "ADIP word 0". The AUN4 corresponds to the "62 ADIP unit" of the "ADIP word 0". The AUN0 corresponds to the "77.5 ADIP unit" of the "ADIP word 0".

AUNs from AUN6 correspond to an area of the "ADIP word 1". The AUN6 corresponds to 10 ADIP unit of the "ADIP word 1". The AUN7 corresponds to 25.5 ADIP unit of the "ADIP word 1". The AUN8 corresponds to 41 ADIP unit of the "ADIP word 1". The AUN9 corresponds to 56.5 ADIP unit of the "ADIP word 1". The AUN10 corresponds to 72 ADIP unit of the "ADIP word 1".

AUNs from AUN11 correspond to an area of the "ADIP word 2". The AUN11 corresponds to 4.5 ADIP unit of the "ADIP word 2". The AUN12 corresponds to 20 ADIP unit of the "ADIP word 2". The AUN13 corresponds to 35.5 ADIP unit of the "ADIP word 2". The AUN14 corresponds to 51 ADIP unit of the "ADIP word 2". The AUN15 corresponds to 66.5 ADIP unit of the "ADIP word 2".

Information associated with the matching table between the AUNs and the ADIP units shown in FIG. 5 is indicative of information stored in the optical recording/reproducing device.

FIG. 6 shows an example in which a single ADIP word is composed of 83 ADIP units according to the present invention.

As can be seen from FIG. 6, the 9 head ADIP units of the ADIP word sequentially include "monotone unit", "sync_0 unit", "monotone unit", "sync_1 unit", "monotone unit", "sync_2 unit", "monotone unit", "sync_3 unit", and "reference unit".

ADIP units from 10-th ADIP unit (i.e., ADIP unit number=9) to 83-rd ADIP unit (i.e., ADIP unit number=82) are each composed of either "data_0 unit" or "data_1 unit". 15 units are formed by combining the ADIP units by four bits, such that the above-mentioned units are referred to as "ADIP codeword nibble numbers (c0~c14)".

A physical address (i.e., Physical ADIP Address "PAA") of a corresponding wobble and auxiliary (AUX) data are recorded in the above-mentioned ADIP codeword nibble number (c0~c14). The optical recording/reproducing device reads the single ADIP word, such that it can recognize the PAA position of a current disc.

Figure 7:
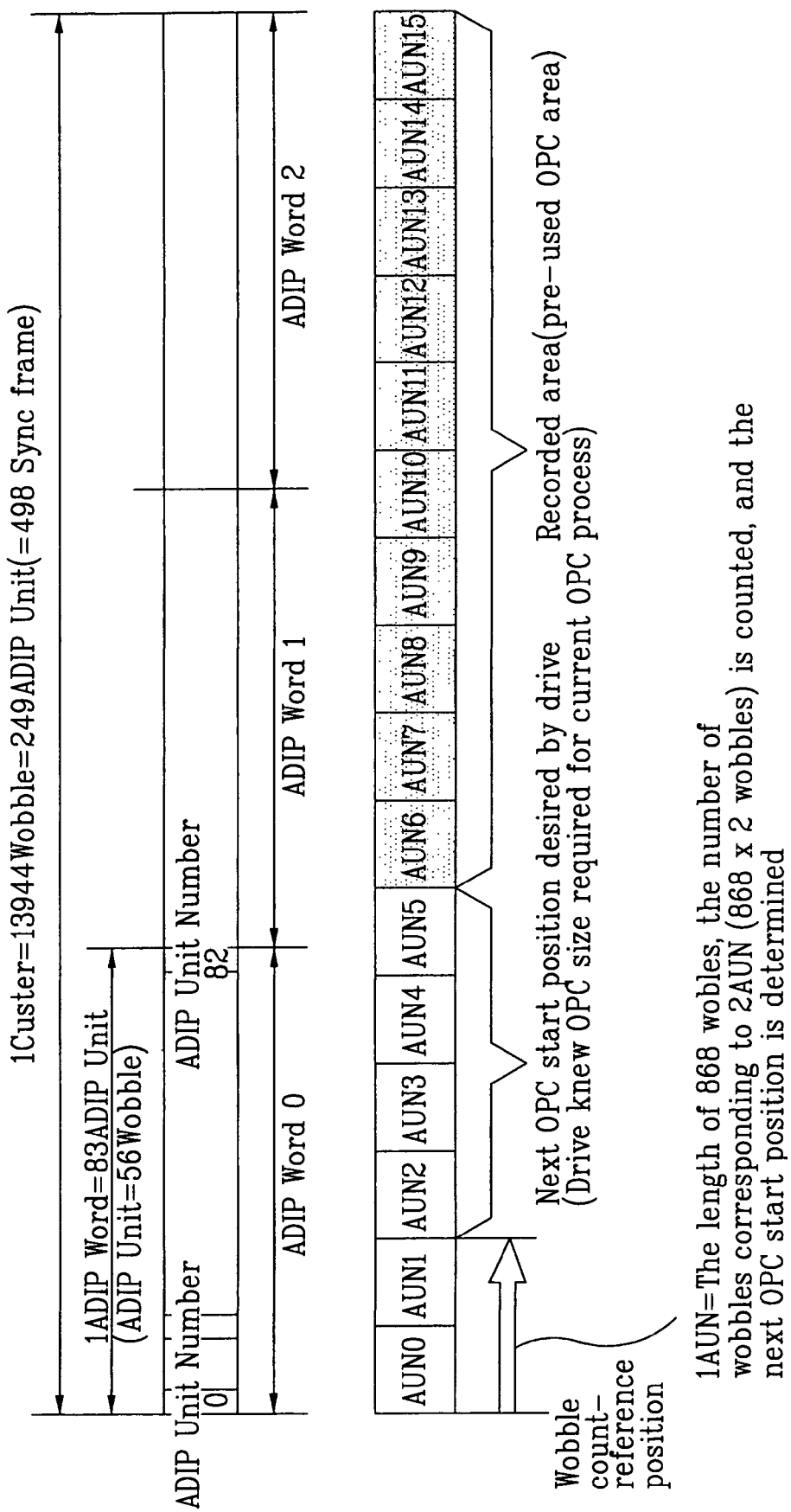
FIG. 7 is a conceptual diagram illustrating a method for searching for an OPC start position using a wobble count process according to the present invention.

FIG. 7 is a conceptual diagram illustrating a method for searching for an OPC start position using a wobble count process according to the present invention.

Referring to FIG. 7, a pre-used (i.e., last used) OPC area (i.e., AUN6~AUN15) contained in the 1 cluster is indicative of 10 AUNs (Address Unit Numbers), and an unused OPC area is indicative of 6 AUNs from AUN0 to AUN5. The AUN 6 in the last used OPC area can be detected by inserting the OPC marker in front of the AUN 6 as described in FIG. 3.

The OPC performing size indicative of a predetermined size required for a current OPC process is predetermined by the optical recording/reproducing device, and can be established in various ways. It is assumed that the OPC performing size is equal to 4 AUNs from AUN2 to AUN5.

Therefore, if a user desires to perform a new OPC process from a predetermined position of the AUN2, the user must search for a physical position corresponding to the AUN2.

Wobble information is adapted to search for a physical position corresponding to the AUN2. The OPC start position must be found on the basis of the ADIP information indicative of address information of the wobble shown in FIG. 6.

In order to determine the OPC start position using a wobble count process, there is a need for a wobble-count reference position to be found. If a predetermined reference wobble is detected in a detection process of the optical recording/reproducing device, the detected reference wobble is considered to be a wobble-count reference position. Preferably, the wobble-count reference position may be equal to a start position of the cluster.

The above-mentioned cluster start position indicative of the wobble-count reference position is identical with a start position of the ADIP word. Referring to FIG. 6, the 9 head ADIP units of the ADIP word sequentially correspond to "monotone unit", "sync_0 unit", "monotone unit", "sync_1 unit", "monotone unit", "sync_2 unit", "monotone unit", "sync_3 unit", and "reference unit". Therefore, if the 9 head ADIP units of the ADIP word are sequentially detected or the first "monotone unit" is detected during a search time of the optical recording/reproducing device, the ADIP-word start position is established. In other words, the cluster start position is considered to be a wobble-count reference position.

According to another example of the above-mentioned reference position, the ADIP-word start position contained in the 1 cluster may be considered to be the wobble-count reference position.

In other words, the 1 cluster includes three ADIP words. It is assumed that the 1 cluster includes the ADIP word 0, the ADIP word 1, and the ADIP word 2. In this case, if the next OPC start position is in the "ADIP Word 1" area or the "ADIP Word 2" area, the 9 head ADIP units of the ADIP word indicative of a start position of the "ADIP Word 2" area sequentially correspond to "monotone unit", "sync_0 unit", "monotone unit", "sync_1 unit", "monotone unit", "sync_2 unit", "monotone unit", "sync_3 unit", "monotone unit", and "reference unit". Otherwise, if the first "monotone unit" is detected, a start position of "ADIP Word 1" area or a start position of the "ADIP Word 2" area is determined to be a wobble-count reference position, such that the number of wobbles can be counted.

Therefore, if the wobble-count reference position is determined, and size information of a pre-used OPC area acting as a recorded area and size information of an OPC area required for a current OPC process are recognized, the optical recording/reproducing device counts the number of wobbles at the wobble-count reference position, and searches for an OPC start position desired by a drive.

According to the preferred embodiment shown in FIG. 7, a drive counts wobbles of two AUNs AUN0 and AUN1. A single AUN corresponds to the length of 868 wobbles. Therefore, two AUNs correspond to the length of 868*2 wobbles, the drive counts the number of 868*2 wobbles to determine an OPC start position, and performs the OPC process in order to calculate an optimum write power at the determined OPC start position.

Figure 8A:
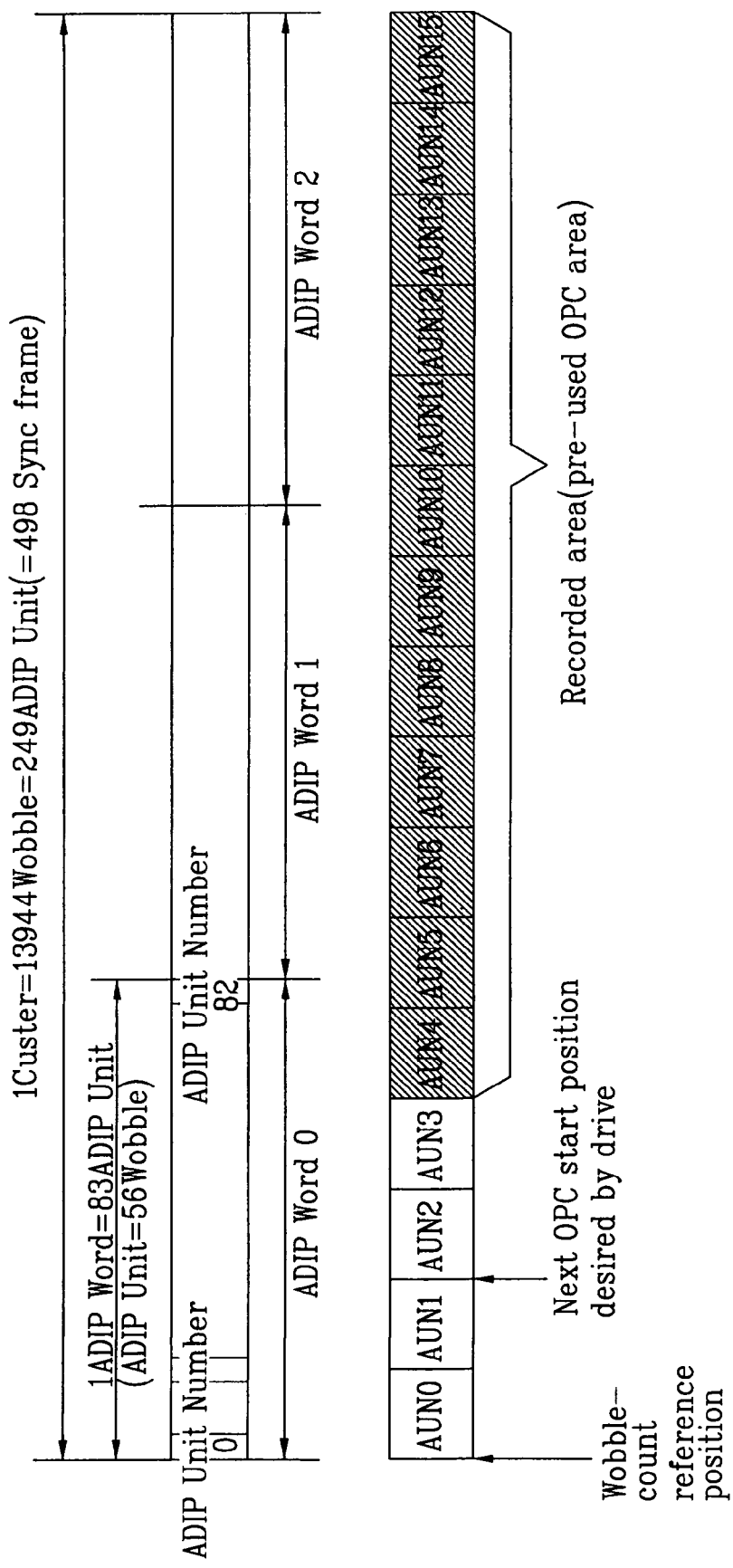
FIG. 8a is a conceptual diagram illustrating a method for searching for an OPC start position using the matching table in accordance with a first preferred embodiment of the present invention.

FIG. 8a is a conceptual diagram illustrating a method for searching for an OPC start position using the matching table in accordance with a first preferred embodiment of the present invention.

Referring to FIG. 8a, a pre-used OPC area indicative of a recorded area of the 1 cluster is indicative of 12 AUNs from AUN 4 to AUN15, and an unused OPC area is indicative of 4 AUNs from AUN0 to AUN3.

The OPC performing size indicative of a predetermined size required for a current OPC process is predetermined by the optical recording/reproducing device, and can be established in various ways. It is assumed that the OPC performing size is equal to 2 AUNs from AUN2 to AUN3 according to the first preferred embodiment of the present invention.

Therefore, if a user desires to perform a new OPC process from a predetermined position of the AUN2, the user must search for a physical position corresponding to the AUN2.

In order to search for a physical position corresponding to the AUN2, the optical recording/reproducing device reads information of the recording medium using the pickup unit, and at the same time searches for the recording medium. A cluster start position is equal to a start position of the ADIP word 0 during the searching time of the recording medium, such that the cluster start position and the start position of the ADIP word 0 are determined to be a wobble-count reference position, and the operation for counting the number of wobbles begins at the wobble-count reference position.

In association with the above-mentioned description, if a predetermined reference wobble is detected, the detected reference wobble is considered to be a reference position. As can be seen from FIG. 6, the 9 head ADIP units of the ADIP word indicative of a start position of the ADIP word 0 sequentially correspond to "monotone unit", "sync_0 unit", "monotone unit", "sync_1 unit", "monotone unit", "sync_2 unit", "monotone unit", "sync_3 unit", and "reference unit". Otherwise, if the first "monotone unit" is detected, the start position of the ADIP word 0 is set to a wobble-count reference position, and the number of wobbles is counted.

Therefore, if the wobble-count reference position is determined, and size information of a pre-used OPC area acting as a recorded area and size information of an OPC area required for a current OPC process are recognized, the optical recording/reproducing device counts the number of wobbles at the wobble-count reference position, and searches for an OPC start position desired by a drive. Referring to the matching table shown in FIG. 5 according to the first preferred embodiment of the present invention, the Correspond ADIP Unit Number of the AUN2 is indicative of the 31 ADIP unit of the ADIP word 0.

In this case, the 1 ADIP unit includes 56 wobbles. If the 1 ADIP unit composed of 56 wobbles is counted at the wobble-count reference position and 31*56 wobbles are then established, an OPC start position desired by a drive acting as the optical recording/reproducing device is determined.

Therefore, if the OPC start position is determined, the OPC process capable of calculating an optimum write power at the determined OPC start position is performed. Therefore, upon receiving a recording command of a disc acting as a corresponding recording medium from the optical recording/reproducing device, the recording command is executed at the calculated optimum write power, such that data is recorded in a data area.

In association with the above-mentioned description, for another example, the ADIP word start position contained in the 1 cluster may be determined to be the wobble-count reference position, and a detailed description thereof will hereinafter be described with reference to FIGS. 8b~8c.

Figure 8B:
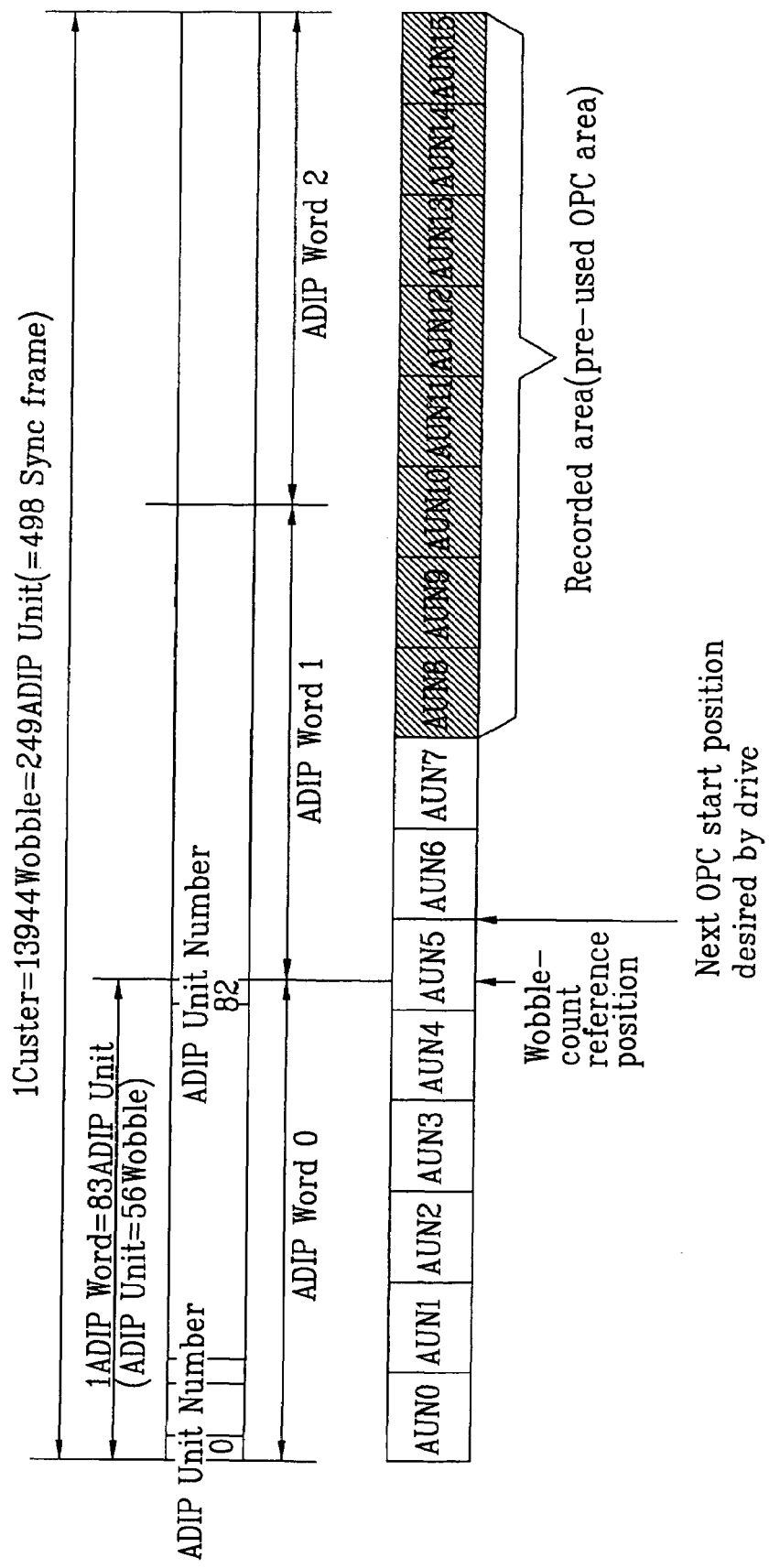
FIG. 8b is a conceptual diagram illustrating a method for searching for an OPC start position using the matching table in accordance with a second preferred embodiment of the present invention.

FIG. 8b is a conceptual diagram illustrating a method for searching for an OPC start position using the matching table in accordance with a second preferred embodiment of the present invention.

Referring to FIG. 8b, a pre-used OPC area indicative of a recorded area of the 1 cluster is indicative of 8 AUNs from AUN8 to AUN15, and an unused OPC area is indicative of 8 AUNs from AUN0 to AUN7.

The OPC performing size indicative of a predetermined size required for a current OPC process is predetermined by the optical recording/reproducing device, and can be established in various ways. It is assumed that the OPC performing size is equal to 2 AUNs from AUN6 to AUN7 according to the second preferred embodiment of the present invention.

Therefore, if a user desires to perform a new OPC process from a predetermined position of the AUN6, the user must search for a physical position corresponding to the AUN6.

In order to search for a physical position corresponding to the AUN6, the optical recording/reproducing device reads information of the recording medium using the pickup unit, and at the same time searches for the recording medium. During the searching time of the recording medium, the start position of the ADIP word 1 is determined to be a wobble-count reference position, such that the operation for counting the number of wobbles begins at the wobble-count reference position.

In association with the above-mentioned description, as can be seen from FIG. 6, the 9 head ADIP units of the ADIP word indicative of a start position of the ADIP word 1 sequentially correspond to "monotone unit", "sync_0 unit", "monotone unit"; "sync_1 unit", "monotone unit", "sync_2 unit", "monotone unit", "sync_3 unit", and "reference unit". Otherwise, if the first "monotone unit" is detected, the start position of the ADIP word 1 is set to a wobble-count reference position, and the number of wobbles is counted.

Therefore, if the wobble-count reference position is determined, and size information of a pre-used OPC area acting as a recorded area and size information of an OPC area required for a current OPC process are recognized, the optical recording/reproducing device counts the number of wobbles at the wobble-count reference position, and searches for an OPC start position desired by a drive. Referring to the matching table shown in FIG. 5 according to the second preferred embodiment of the present invention, the Correspond ADIP Unit Number of the AUN6 is indicative of the 10 ADIP unit of the ADIP word 1.

In this case, the 1 ADIP unit includes 56 wobbles in the same manner as in the first preferred embodiment of the present invention. If the 1 ADIP unit composed of 56 wobbles is counted at the wobble-count reference position and 10*56 wobbles are then established, an OPC start position desired by a drive acting as the optical recording/reproducing device is determined. Therefore, the OPC process capable of calculating an optimum write power at the determined OPC start position is performed.

Figure 8C:
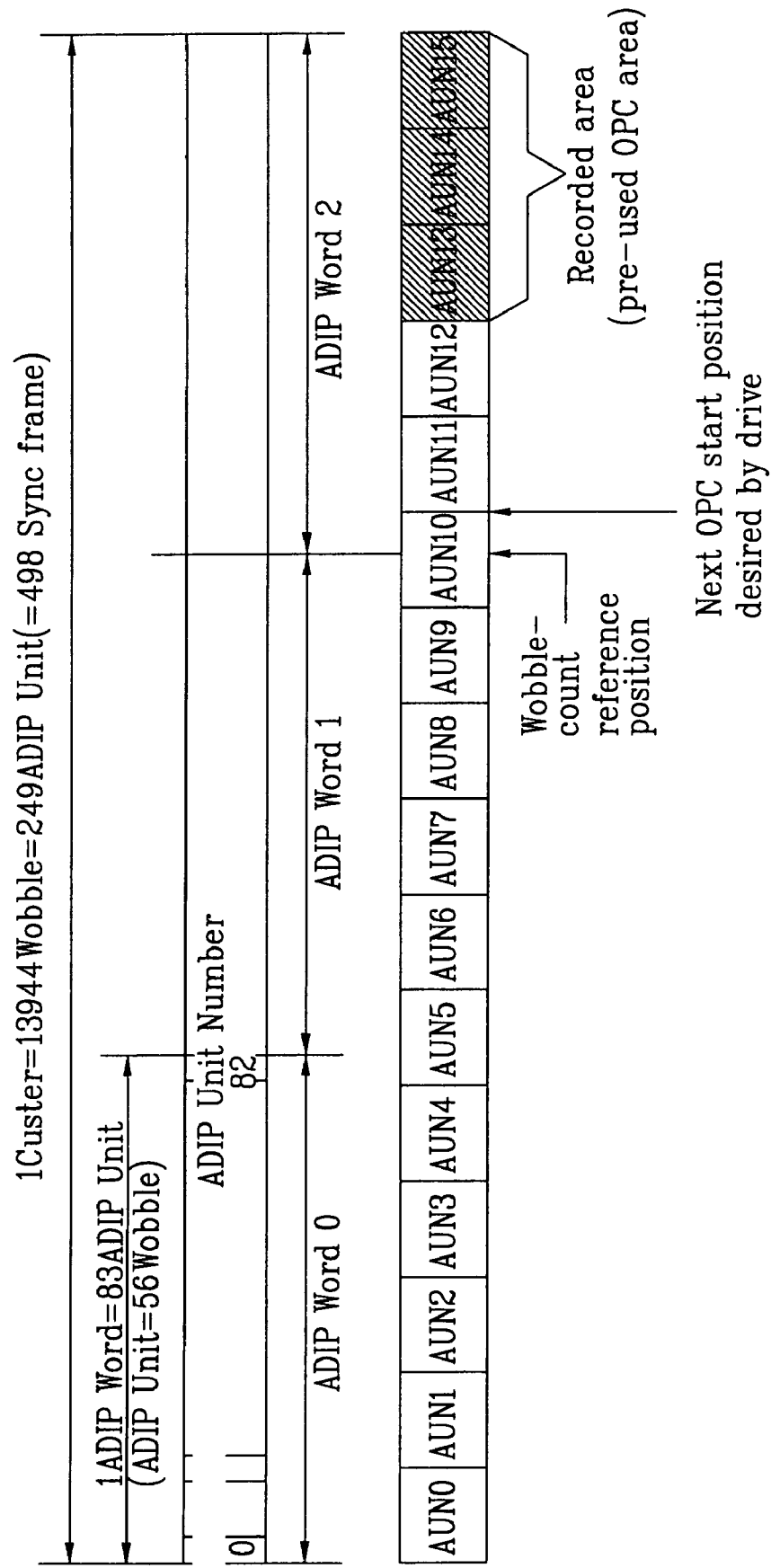
FIG. 8c is a conceptual diagram illustrating a method for searching for an OPC start position using the matching table in accordance with a third preferred embodiment of the present invention.

FIG. 8c is a conceptual diagram illustrating a method for searching for an OPC start position using the matching table in accordance with a third preferred embodiment of the present invention.

Referring to FIG. 8c, a pre-used OPC area indicative of a recorded area of the 1 cluster is indicative of 3 AUNs from AUN13 to AUN15, and an unused OPC area is indicative of 13 AUNs from AUN0 to AUN12.

The OPC performing size indicative of a predetermined size required for a current OPC process is predetermined by the optical recording/reproducing device, and can be established in various ways. It is assumed that the OPC performing size is equal to 2 AUNs from AUN11 to AUN12 according to the third preferred embodiment of the present invention.

Therefore, if a user desires to perform a new OPC process from a predetermined position of the AUN11, the user must search for a physical position corresponding to the AUN11. In order to search for a physical position corresponding to the AUN11, the optical recording/reproducing device reads information of the recording medium using the pickup unit, and at the same time searches for the recording medium. During the searching time of the recording medium, the start position of the ADIP word 2 is determined to be a wobble-count reference position, such that the operation for counting the number of wobbles begins at the wobble-count reference position.

In association with the above-mentioned description, as can be seen from FIG. 6, the 9 head ADIP units of the ADIP word indicative of a start position of the ADIP word 2 sequentially correspond to "monotone unit", "sync_0 unit", "monotone unit", "sync_1 unit", "monotone unit", "sync_2 unit", "monotone unit", "sync_3 unit", and "reference unit". Otherwise, if the first "monotone unit" is detected, the start position of the ADIP word 2 is set to a wobble-count reference position, and the number of wobbles is counted.

Therefore, if the wobble-count reference position is determined, and size information of a pre-used OPC area acting as a recorded area and size information of an OPC area required for a current OPC process are recognized, the optical recording/reproducing device counts the number of wobbles at the wobble-count reference position, and searches for an OPC start position desired by a drive. Referring to the matching table shown in FIG. 5 according to the third preferred embodiment of the present invention, the Correspond ADIP Unit Number of the AUN11 is indicative of the 4.5 ADIP unit of the ADIP word 2.

In this case, the 1 ADIP unit includes 56 wobbles in the same manner as in the third preferred embodiment of the present invention. If the 1 ADIP unit composed of 56 wobbles is counted at the wobble-count reference position and 4.5*56 wobbles are then established, an OPC start position desired by a drive acting as the optical recording/reproducing device is determined. Therefore, the OPC process capable of calculating an optimum write power at the determined OPC start position is performed.

Therefore, if the wobble-count reference position is determined, and size information of a pre-used OPC area acting as a recorded area and size information of an OPC area required for a current OPC process are recognized, it can be recognized that the optical recording/reproducing device counts the number of wobbles at the wobble-count reference position, and searches for an OPC start position desired by a drive.

Figure 9:
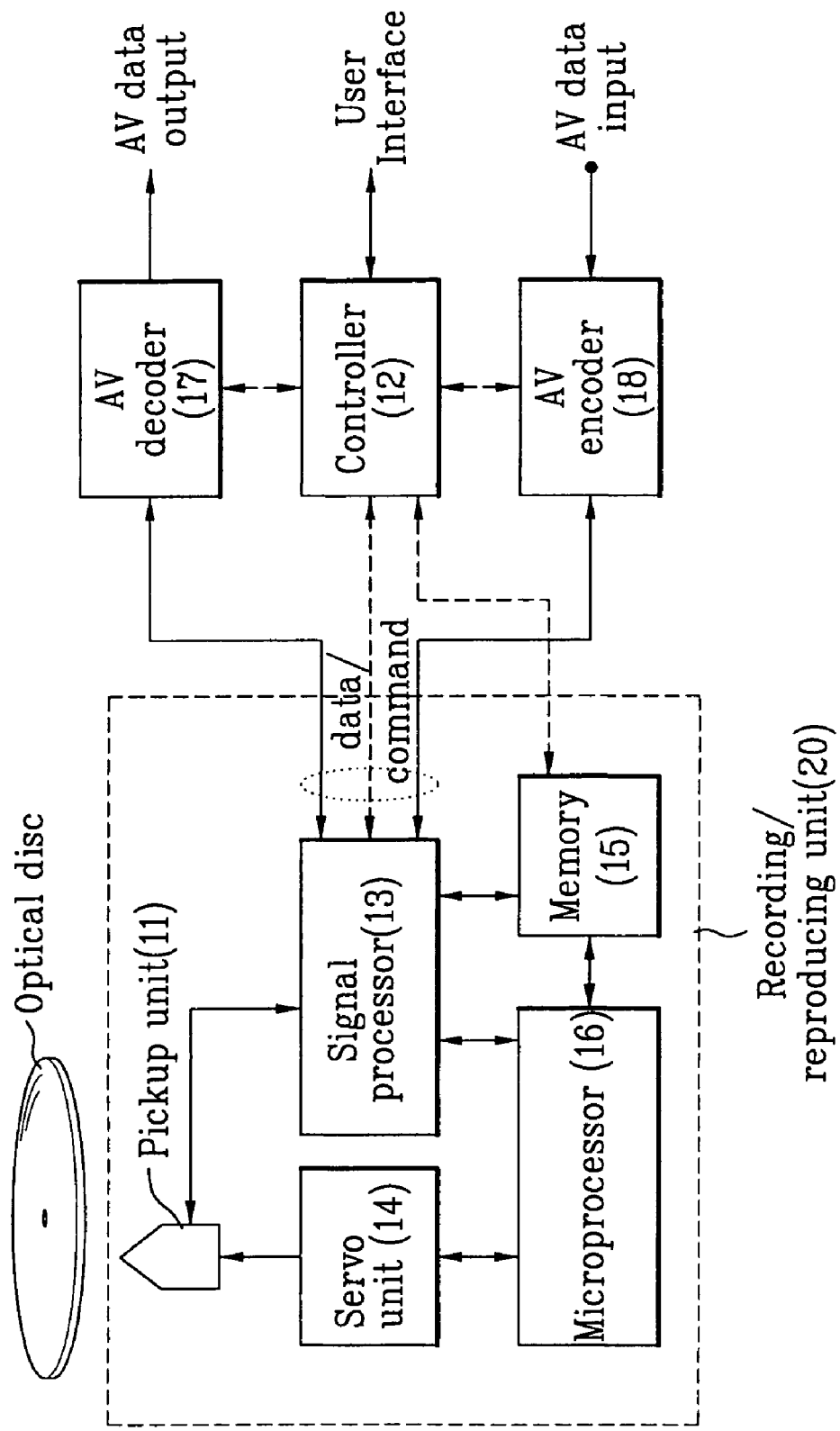
FIG. 9 is a block diagram illustrating an optical recording/reproducing device according to the present invention.

FIG. 9 is a block diagram illustrating an optical recording/reproducing device according to the present invention.

Referring to FIG. 9, the optical recording/reproducing device includes a recording/reproducing unit 20 for recording/reproducing data in/from an optical disc, and a controller 12 for controlling the recording/reproducing unit 20.

The recording/reproducing unit 20 includes a pickup unit 11, a signal processor 13, a servo unit 14, a memory 15, and a microprocessor 16. The pickup unit 11 directly records data in the optical disc, or reads data recorded in the optical disc. The signal processor 13 receives a signal read from the pickup unit 11, restores the received signal to a desired signal value, or modulates a signal to be recorded into another signal recorded in the optical disc, such that it transmits the recovered or modulated result. The servo unit 14 controls operations of the pickup unit 11, such that it correctly reads a desired signal from the optical disc, and correctly records the signal in the optical disc. The memory 15 temporarily stores not only management information but also data. The microprocessor 16 controls overall operations of the above-mentioned components.

The above-mentioned recording/reproducing unit 20 performs a predetermined test in a test area of a recording medium, such that it calculates an optimum write power, and records the calculated optimum write power.

In association with the above-mentioned description, the optical recording/reproducing device composed of only the recording/reproducing unit 20 is referred to as a drive, and is generally used as a peripheral device of a computer.

The controller 12 controls operations of overall constituent components. In association with the present invention, the controller 12 refers to a user command by interfacing with a user, and transmits a recording/reproducing command capable of recording/reproducing data in/from the optical disc to the recording/reproducing unit 20.

The decoder 17 decodes a signal read from the optical disc upon receiving a control signal from the controller 12, restores the decoded signal to desired information, and transmits the restored signal to the user.

The encoder 18 receives a control signal from the controller 12 to record a desired signal in the optical disc, converts the received signal into a specific-format signal (e.g., an MPEG2 transport stream), and transmits the specific-format signal to the signal processor 13.

The memory 15 stores information of the matching table shown in FIG. 5. The microprocessor 16 performs a recording medium test using the matching table information stored in the memory 15, calculates an optimum write power, and controls the recording/reproducing unit 20 capable of recording an optimum write power at the calculated optimum write power.

Figure 10:
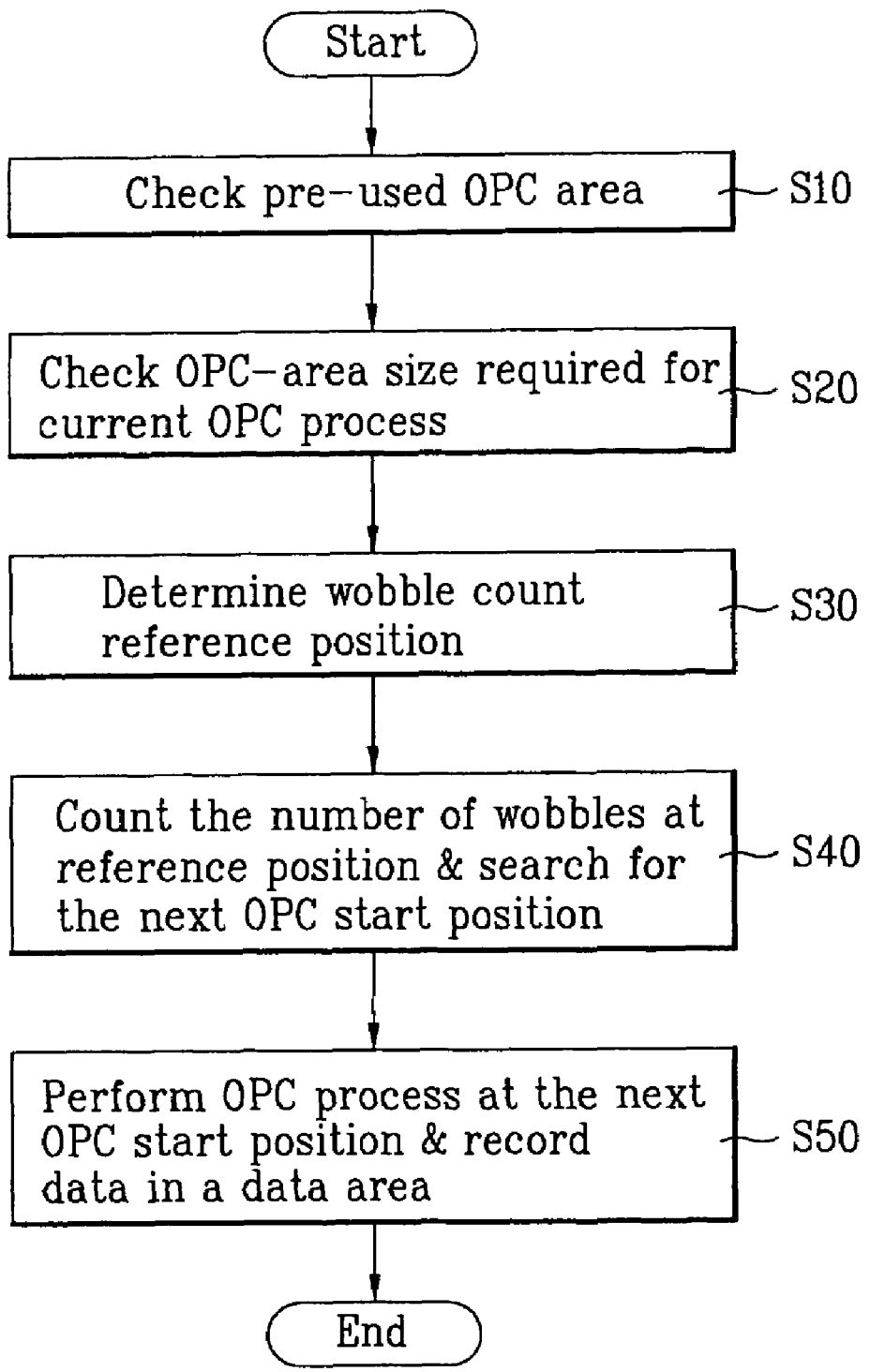
FIG. 10 is a flow chart illustrating a method for recording data in a recording medium using the optical recording/reproducing device according to the present invention.

FIG. 10 is a flow chart illustrating a method for recording data in a recording medium using the optical recording/reproducing device according to the present invention.

Referring to FIG. 10, if an optical disc including the OPC and DCZ areas is loaded in the optical recording/reproducing device, the microprocessor 16 contained in the recording/reproducing unit 20 controls the pickup unit 11 using the servo unit 14, and performs scanning of the loaded disc to read information associated with the pre-used OPC area, such that it recognizes a pre-used OPC area at step S10. In association with the above-mentioned description, the TDMA area for storing management information of the recording medium also stores management information associated with the OPC area, such that it stores information associated with the pre-used OPC area, esp. information indicating start position of the pre-used OPC area.

The size of the OPC area required for the current OPC process is predetermined in the optical recording/reproducing device, such that the microprocessor 16 recognizes the size of the OPC area at step S20.

Thereafter, the wobble-count reference position is determined at step S30. As previously stated above, the wobble-count reference position is indicative of a cluster start position or start positions of the ADIP word 0, the ADIP word 1, and the ADIP word 2 acting as the ADIP words. The 9 head ADIP units of the ADIP word are associated with the start position of the ADIP word, and sequentially include "monotone unit", "sync_0 unit", "monotone unit", "sync_1 unit", "monotone unit", "sync_2 unit", "monotone unit", "sync_3 unit", and "reference unit". Otherwise, if the first "monotone unit" is detected, the wobble-count reference position can be recognized. It is preferable that the start position of the ADIP word is set to the wobble-count reference position.

If the wobble-count reference position is detected at step S30, the microprocessor 16 of the optical recording/reproducing device starts counting the number of wobbles at the determined wobble-count reference position to search for the next OPC start position at step S40.

When searching for the OPC start position using the matching table, the microprocessor 16 also searches for wobbles identical with the ADIP unit shown in the matching table. In more detail, the microprocessor 16 counts the number of wobbles identical with the ADIP unit. In this case, the wobble-count start position act as the next OPC start position.

The recording/reproducing unit 20 performs the OPC process to calculate an optimum write power at the searched current OPC start position. Upon receiving a recording command of a corresponding disc from the controller 12, the recording/reproducing unit 20 performs a corresponding recording command at the calculated optimum write power, and records data in a data area at step S50.

Therefore, the present invention provides a method for searching for the OPC start position at which the current OPC process is to be performed in order to effectively use an unused OPC area in the OPC area, such that the OPC process can be performed at the searched OPC start position.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of recording data in a recording medium including a wobble-shaped test area, comprising the steps of:
   searching for an Optimum Power Control (OPC) start position of the test area by counting the number of wobbles at a wobble-count reference position;
   performing an OPC process to calculate an optimum write power at the searched OPC start position; and
   recording data in a data area using the calculated optimum write power.

2. The method according to claim 1, further comprising the step of:
   determining an OPC-area size required for a current OPC process.

3. The method according to claim 1, further comprising:
   determining a pre-used test area, and
   wherein the determining step determines the pre-used test area based on management information stored in the recording medium.

4. The method according to claim 3, wherein the management information is stored in management area of the recording medium, and the management information indicates a start position of the pre-used area.

5. The method according to claim 1, wherein the searching step includes a step of determining the wobble-count reference position if a reference wobble is detected.

6. The method according to claim 1, wherein the searching step includes a step of determining the wobble-count reference position indicating start position of physical cluster.

7. The method according to claim 1, wherein the searching step includes a step of determining the wobble-count reference position indicating a start position of an ADIP (Address In Pre-groove) word.

8. The method according to claim 7, wherein the start position of the ADIP word is recognized by information of an ADIP unit contained in the ADIP word.

9. The method according to claim 1, wherein the searching step determines the OPC start position based on an OPC-area size required for a current OPC process.

10. The method according to claim 9, wherein the OPC start position is varied depending on the OPC-area size required for the current OPC process.

11. An apparatus for recording data in a recording medium, comprising:
    a pickup unit configured to record data on the recording medium, and configured to read data from the recording medium; and
    a microcomputer configured to control searching for an Optimum Power Control (OPC) start position in a test area of the recording medium by counting the number of wobbles at a wobble-count reference position, configured to control performing an OPC process at the searched OPC start position to calculate an optimum write power, and configured to control the pickup unit to record data in a data area using the calculated optimum write power.

12. The apparatus according to claim 11, wherein the microcomputer is further configured to control to determine an OPC-area size required for a current OPC process.

13. The apparatus according to claim 11, wherein the microcomputer is further configured to control determining a pre-used area based on management information stored in the recording medium.

14. The apparatus according to claim 13, wherein the management information indicates a start position of the pre-used test area.

15. The apparatus according to claim 11, wherein the microcomputer is configured to control determining the wobble-count reference position if a predetermined reference wobble is detected.

16. The apparatus according to claim 11, wherein the microcomputer is configured to control determining the wobble-count reference position indicating start position of physical cluster.

17. The apparatus according to claim 11, wherein the microcomputer is configured to control determining the wobble-count reference position indicating a start position of an ADIP (Address In Pre-groove) word.

18. The apparatus according to claim 11, wherein the microcomputer is configured to control determining the OPC start position based on an OPC-area size required for a current OPC process.

19. A recording medium including an inner area, a data area and an outer area, comprising:
    a test area contained in at least one of the inner area and the outer area; and
    a management area storing a position information indicating an Optimum Power Control (OPC) start position of the test area, wherein the OPC start position is provided by counting the number of wobbles at a wobble-count reference position.

* * * * *